(12) United States Patent
Bilskie et al.

(10) Patent No.: US 6,296,153 B1
(45) Date of Patent: Oct. 2, 2001

(54) SELF-CONTAINED HIGH PRESSURE PNEUMATIC BEVERAGE DISPENSING SYSTEM

(75) Inventors: Richard P. Bilskie, Grantville; Edward N. Oyler, Newnan; Harold F. Stover, Grantville, all of GA (US)

(73) Assignee: S.O.B. Partnership, Newnan, GA (US)

( * ) Notice: Subject to any disclaimer, the term of this patent is extended or adjusted under 35 U.S.C. 154(b) by 0 days.

(21) Appl. No.: 09/413,268

(22) Filed: Oct. 6, 1999

(51) Int. Cl.[7] ................................................. G01F 11/04
(52) U.S. Cl. ................................. 222/249; 222/129.2
(58) Field of Search ............................ 222/129.2, 249, 222/334, 386.5, 389

(56) References Cited

U.S. PATENT DOCUMENTS

| | | | |
|---|---|---|---|
| 3,370,759 | * | 2/1968 | Johansson ............................. 222/249 |
| 4,305,531 | * | 12/1981 | Dooley et al. ....................... 222/334 |
| 4,967,936 | * | 11/1990 | Bingler ................................ 222/129.2 |

* cited by examiner

Primary Examiner—Philippe Derakshani
Assistant Examiner—Thach H Bui
(74) Attorney, Agent, or Firm—Thomas, Kayden, Horstemeyer & Risley, LLP (57) ABSTRACT

The present disclosure relates to a self-contained high pressure pneumatic beverage dispensing system which includes a water pressurization and supply system. In one aspect of the invention, the water pressurization and supply system comprises a water pump having a piston cylinder and a piston that is disposed within the piston cylinder between the first and second ends of the cylinder. The water pump is adapted to be filled with high pressure gas on a first side of the cylinder through a gas inlet and further is adapted to be filled with water on a second side of the cylinder through a water inlet. In a further embodiment of the invention, the pressurization and supply system can further include a water pump control system that comprises a first piston sensor positioned adjacent the first end of the piston cylinder, a second piston sensor positioned adjacent the second end of the piston cylinder, and a water pump control valve operably connected to the first and second piston sensors and in fluid communication with the gas inlet of the piston cylinder.

36 Claims, 6 Drawing Sheets

SELF-CONTAINED HIGH PRESSURE PNEUMATIC BEVERAGE DISPENSING SYSTEM

CROSS-REFERENCE TO RELATED APPLICATION

The present application claims the benefit of the filing date of U.S. patent application Ser. No. 08/965,711, filed Nov. 7, 1997, now U.S. Pat. No. 6,021,922, which is incorporated herein by reference in its entirety.

FIELD OF THE INVENTION

The present disclosure relates generally to a beverage dispensing system configured for portable or fixed installations. More particularly, the present disclosure relates to a self-contained, high pressure pneumatic beverage dispensing system that is especially adapted for use on commercial aircraft, railcars, ships, and the like, as well as for installation in golf carts and other such small vehicles.

BACKGROUND OF THE INVENTION

Conventionally, beverage dispensing systems have required electrical or gasoline power. Therefore, these systems tend to be bulky and usually are unsuitable for portable applications. applications.

Typically, conventional beverage dispensing systems comprise a high pressure carbonator tank plumbed to a carbon dioxide ($CO_2$) cylinder through a pressure regulator in which the pressure to be supplied to the carbonator tank is reduced to approximately 90 pounds per square inch (psi). A motorized pump plumbed to a fixed water tap system is used to pressurize the water supplied to the tank to approximately 200 psi. The high pressure water flows into the carbonator tank, overcoming the rising pressure of the $CO_2$ gas contained therein. As the carbonator tank fills with this high pressure water, a pocket of $CO_2$ gas that exists above the water is compressed, forcing the $CO_2$ gas to be absorbed into the water, thereby creating carbonated water. In that these conventional beverage dispensing systems require a constant source of power to operate the pump motor, use of such systems is generally limited to fixed installations.

Although portable beverage dispensing systems that do not require electrical or gasoline powered pumps have been developed, these systems have several disadvantages. One such system is that disclosed in U.S. Pat. No. 5,411,179 (Oyler et al.) and U.S. Pat. No. 5,553,749 (Oyler et al.). Similar to the systems described in the present disclosure, the system described in these patents uses high pressure $CO_2$ gas supplied by a $CO_2$ tank to pressurize the water that is supplied to a carbonator tank. Unlike the present systems described in the present disclosure, however, the system described in these patent references uses a low pressure carbonator which typically operates at pressures below 100 psi.

Despite providing for some degree of water carbonation (typically, approximately 2.5%), such low pressure systems do not produce beverages having a commercially acceptable level of carbonation (generally between 3.0% to 4.0%). Experimentation has shown that the pressurized water must be cooled to a low temperature prior to entering the carbonator tank of these systems to achieve absorption of $CO_2$ gas into the water. This cooling typically is effected by using a cold plate through which the pressurized water passes just prior to being supplied to the carbonator tank.

As mentioned above, low, albeit marginally acceptable, levels of carbonation can be attained with these low pressure systems. One significant drawback of using this method, however, is that the $CO_2$ gas contained within the carbonated water can be quickly diffused from the water when it is heated to a warmer temperature. Accordingly, when the carbonated water is post-mixed with relatively warm liquids such as concentrated syrups, juices, and the like, the relatively small amount of carbonation contained within the water can be lost quickly.

From the foregoing, it can be appreciated that it would be desirable to have a self-contained beverage dispensing system that is completely portable and that produces beverages having a commercially acceptable level of stable carbonation.

SUMMARY OF THE INVENTION

The present disclosure relates to a self-contained high pressure pneumatic beverage dispensing system. In particular, the disclosure relates to such a system which includes water pressurization and supply system. In one aspect of the invention, the water pressurization and supply system comprises a water pump having a piston cylinder including first and second ends and a gas inlet in fluid communication with a first side of the cylinder and a water inlet and water outlet in fluid communication with a second side of the cylinder. The water pump further has a piston that is disposed within the piston cylinder between the first and second ends. Configured in this manner, the water pump is adapted to be filled with high pressure gas on the first side of the cylinder through the gas inlet and further is adapted to be filled with water on the second side of the cylinder through the water inlet.

The water pressurization and supply system can further include a water pump control system that comprises a first piston sensor positioned adjacent the first end of the piston cylinder, a second piston sensor positioned adjacent the second end of the piston cylinder, and a water pump control valve operably connected to the first and second piston sensors and in fluid communication with the gas inlet of the piston cylinder. In use, the first piston sensor can send a signal to the control valve when proximity of the piston is sensed to cause the control valve to open to permit high pressure gas to enter the first side of the piston cylinder and pressurize the water contained in the second side of the piston cylinder. Similarly, the second piston sensor can send a signal to the control valve when proximity of the piston is sensed to cause the control valve to close and vent gas contained in the first side of the piston cylinder, thereby permitting the second side of the piston cylinder to be refilled with water.

The features and advantages of the invention will become apparent upon reading the following specification, when taken in conjunction with the accompanying drawings.

DETAILED DESCRIPTION

Referring now in more detail to the drawings, in which like numerals indicate corresponding parts throughout the several views, FIGS. 1–8 illustrate various embodiments of a self-contained, high pressure pneumatic beverage dispensing system of the present invention.

Figure 1:
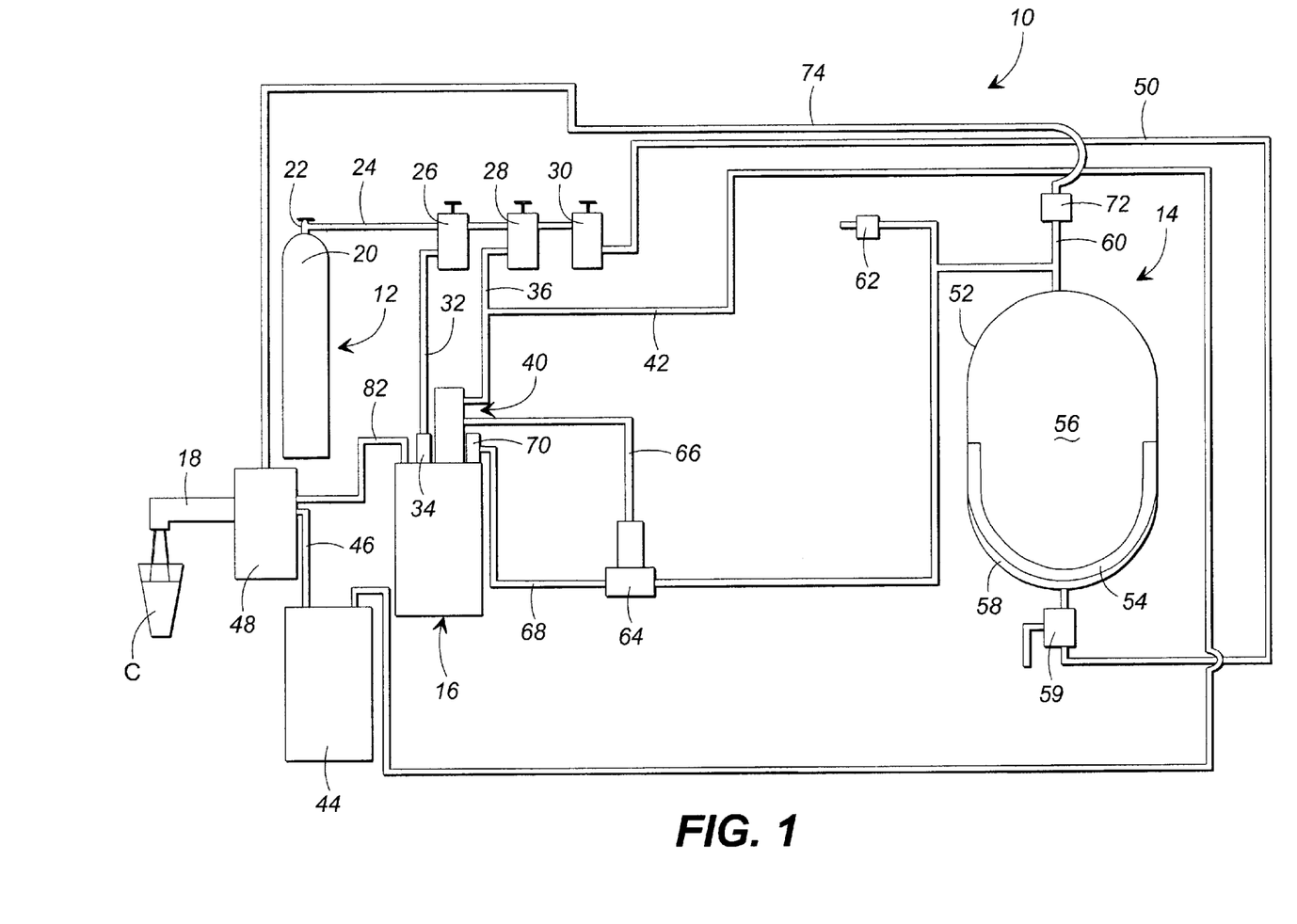
FIG. 1 is a schematic view of a first embodiment of a self-contained high pressure pneumatic beverage dispensing system.

FIG. 1 is a schematic view of a first embodiment 10 of the self-contained high pressure pneumatic beverage dispensing system. The system generally comprises a source 12 of gas, typically carbon dioxide ($CO_2$) at high pressure, a source 14 of high pressure water, a high pressure carbonator tank 16, and a beverage dispensing valve 18. The source 14 of $CO_2$ at high pressure typically comprises a conventional refillable gas storage tank 20 that is filled with pressurized $CO_2$ gas. As will be discussed in more detail below, the pressurized $CO_2$ gas contained within the gas storage tank 20 is used to both carbonate water in the carbonator tank 16 as well as to pressurize and propel the water to be supplied to the carbonator tank.

The $CO_2$ gas exits the gas storage cylinder 20 through a gas shut-off valve 22. When the gas shut-off valve 22 is opened, $CO_2$ gas travels through a gas outlet line 24 and is supplied to three separate gas pressure regulators 26, 28, and 30. The gas traveling through the first pressure regulator 26 is reduced in pressure to approximately 90 pounds per square inch (psi) to 110 psi and then exits the pressure regulator to enter a carbonator tank supply line 32. The carbonator tank supply line 32 directs the $CO_2$ gas to a gas inlet check valve 34 of the high pressure carbonator tank 16 so that the carbonator tank can be filled with pressurized $CO_2$ gas.

The $CO_2$ gas that travels through the second gas pressure regulator 28 in which the pressure of the gas is reduced in pressure to approximately 25 psi to 60 psi. After exiting the second gas pressure regulator 28, the $CO_2$ gas flows into a carbonator tank water level switch line 36. The water level switch line 36 is connected to a carbonator tank water level switch 40, the configuration and operation of which is described in detail hereinafter.

Along the water level switch line 36, between the second gas pressure regulator 28 and the water level switch 40, is a syrup container supply line 42 that is in fluid communication with a concentrated syrup container 44. As is conventional in the beverage dispensing art, this syrup container 44 stores concentrated syrup that can be mixed with carbonated water to make soft drinks such as sodas. When pressurized with gas pressure supplied through the syrup container supply line 42, the concentrated syrup exits the syrup container 44 and flows through a syrup container outlet line 46. The syrup container outlet line 46 leads to a cold plate 48 in which the syrup is cooled to an appropriate serving temperature. From the cold plate 48, the syrup then can be discharged through the beverage dispenser valve 18 when desired. Although described as a concentrated syrup container which stores concentrated syrup, it will be understood by those having ordinary skill in the art that alternative concentrated liquids such as juice concentrate and the like could be substituted for the syrup if desired. Accordingly, the identification of a syrup container is not intended to limit the scope of the present disclosure.

The $CO_2$ gas supplied to the third gas pressure regulator 30 is lowered in pressure to approximately 175 psi to 225 psi. After passing through the third gas pressure regulator 30, the $CO_2$ gas is ported through a high pressure gas supply line 50 that supplies gas pressure to the pressurized water source 14 of the system. In this first embodiment, the water source 14 comprises a high pressure water tank 52. Although capable of alternative configurations, this water tank 52 typically is constructed of a strong metal such as stainless steel. Inside the water tank 52 is a pliable diaphragm 54 that separates the interior of the water tank into two separate chambers 56 and 58. The water, or upper, chamber 56 of the water tank is adapted to store water that will be supplied to the carbonator tank 16 for carbonization. The gas, or lower, chamber 58 is adapted to receive high pressure gas that is used to pressurize the water contained in the upper chamber 56. The pliable diaphragm 54 completely isolates each chamber from the other such that no mixture of the water and $CO_2$ gas can occur.

Connected to the water chamber side of the water tank 52 is a water chamber line 60. Among other functions to be discussed hereinafter, the water chamber line 60 is used to refill the water chamber 56 of the water tank 52. To refill the tank 52, a refill inlet check valve 62 connected to one branch of the water chamber pipeline 60 is connected to a source of water having positive head pressure which, depending upon personal preferences, can be a source of purified water or a standard tap water source. It will be understood that refilling should only be attempted when the water tank is in a depressurized state.

Positioned along the high pressure gas supply line 50 between the third gas pressure regulator 30 and the water tank 52 is a three-way vent valve 59. The three-way vent valve 59 is manually operable to control the pressurization or depressurization of the lower chamber 58 of the water tank. When switched to open position, the three-way vent valve 59 directs high pressure $CO_2$ gas into the lower chamber 58 of the water tank 52. This high pressure gas urges the pliable diaphragm 54 upward against the volume of water contained within the upper chamber 56 to increase the pressure of the water to a level within the range of approximately 175 psi to 225 psi. When the operator wishes to refill the tank with water in the manner described above, the three-way vent valve 59 is manually switched to a closed position in which the supply of high pressure $CO_2$ gas to the tank is shut-off, and the high pressure gas contained in the lower chamber of the water tank is vented to the atmosphere to relieve the pressure therein. This reduction of pressure within the tank 52 permits the operator to refill the tank with any water source capable of supplying water at a positive head pressure.

In addition to providing for refilling of the water tank 52, the water chamber line 60 is further used to transport the pressurized water supplied by the water tank in two separate directions. In a first direction, the water is taken to a water valve 64 that is positioned intermediate the water tank 52 and the carbonator tank 16 along the water flow path existing between these two tanks. Typically, the water valve 64 is pneumatically actuated to open or close to permit or prevent the flow of water therethrough. In a preferred arrangement, the water valve 64 comprises a normally closed, gas actuated, high pressure bellows valve. Considered suitable for this use are HB Series bellows valves manufactured and commercially available from by Nupro, U.S.A. Coupled with a pneumatic signal line 66, the water valve 64 and water level switch 40 are in fluid communication with one another. When supplied with a pneumatic pressure signal sent from the water level switch, the water valve 64 opens, permitting high pressure water supplied by the water tank 52 to pass through the valve and into a carbonator tank water supply line 68. In use, the water is transported through this water supply line 68 to a water inlet check valve 70 that is mounted to the carbonator tank 16 such that the carbonator tank can be filled with the high pressure water.

In addition to transporting high pressure water in the first direction to the water valve 64, the water chamber pipeline transports the water exiting the water tank 52 in a second direction to a water pressure regulator 72. This pressure regulator reduces the pressure of the water supplied from the water tank to approximately 40 psi. From the water pressure regulator 72, the water flows through a flat water supply line 74 and then through the cold plate 48 to be dispensed by the beverage dispenser 18 when activated by the operator.

Figure 2:
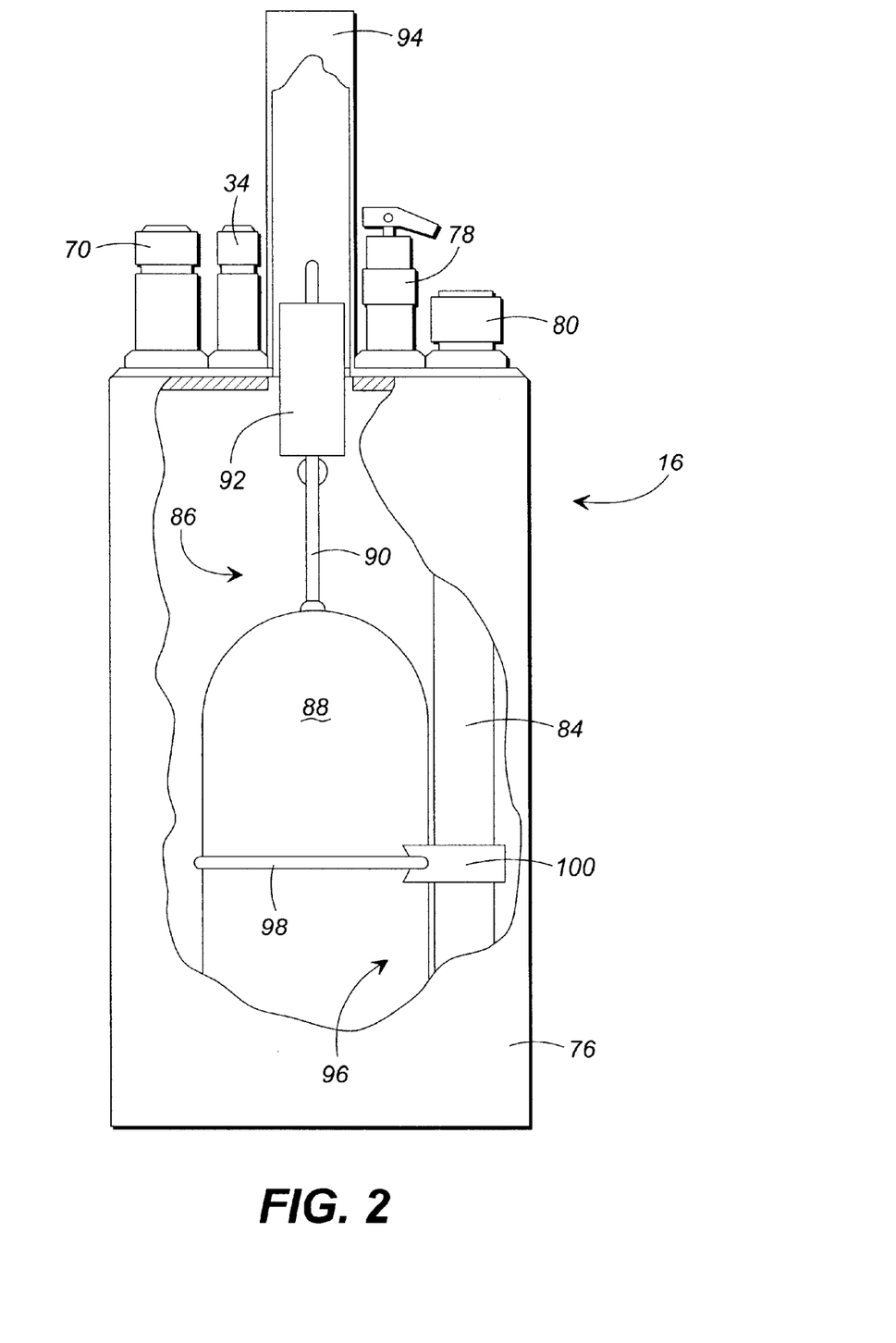
FIG. 2 is a cut-away side view of the high pressure carbonator tank used in the beverage dispensing system of FIG. 1.

The primary components of the first embodiment of the invention having been described, the configuration and operation of the high pressure carbonator tank will now be discussed. FIG. 2 illustrates, in cut-away view, the carbonator tank 16 preferred for use in the present embodiment. As depicted in the figure, the carbonator tank 16 comprises a generally cylindrical tank 76. Mounted to the top of the tank 76 are the gas inlet check valve 34 and the water inlet check valve 70 as well as a safety relief valve 78 of conventional design. Further mounted to the top of the carbonator tank 76 is a carbonated water outlet 80 that is fluidly connected to a carbonated water supply line 82 (FIG. 1). Inside the tank is a carbonated water supply tube 84 that extends from the bottom of the tank up to the carbonated water outlet 80 such that, when the beverage dispenser valve 18 is activated, pressurized carbonated water from the bottom of the carbonator tank is forced through the supply tube 84, out of the carbonated water outlet 80, through the carbonated water supply line 82, through the cold plate 48, and finally out of the dispenser valve into a suitable beverage container C.

In addition to the above components, the carbonator tank 16 can further comprise a mechanical water level indicator system 86. This system includes a hollow float member 88 having a rod 90 extending upwardly from the top portion of the float member. Positioned on the top of the rod 90 is a magnetic member 92, by way of example, in the form of a magnetic cylinder. When the tank 76 is empty, the float member 88 rests on the bottom of the carbonator tank. Situated in this empty configuration, part of the magnetic member 92 is positioned within the tank 76 and part is positioned within an elongated hollow tube 94 that extends upwardly from the top of the tank. This hollow tube 94 permits travel of the rod 90 and magnetic member 92 in the upward direction, the purpose for which is explained hereinafter. Presently considered to be in accordance with the above description is the Model M-6 carbonator available from Jo-Bell.

As the tank 76 is filled with water, the buoyancy of the float member 88 causes it to float towards the top of the tank. To maintain the float member 88, rod 90, and magnetic member 92 in the correct orientation, a mechanical stabilizer 96 can be provided. As illustrated in the figure, the stabilizer 96 can comprise a retainer band 98 that is wrapped around the float member 88 and a slide member 100 which is disposed about the carbonated water supply tube 84 and to which the retainer band is fixedly attached. Configured in this manner, the float member 88 will continue to rise within the carbonator tank 76 as the water level within the tank increases. Similarly, the magnetic member 92 will rise within the elongated hollow tube 94 so that water level sensing means can detect when the tank 76 is full so that water flow into the tank can be halted.

Figure 3:
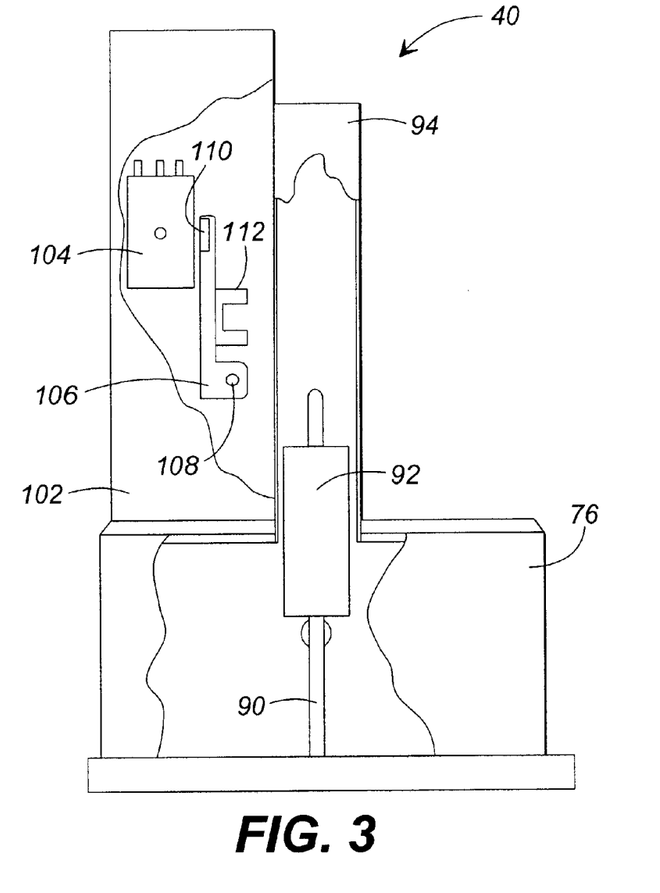
FIG. 3 is a cut-away side view of the carbonator tank of FIG. 2 with a pneumatic water level switch mounted thereto (and with all inlet and outlet valves removed), this switch also shown in cut-away view to depict the activated or fill position of the pneumatic water level switch.
Figure 4:
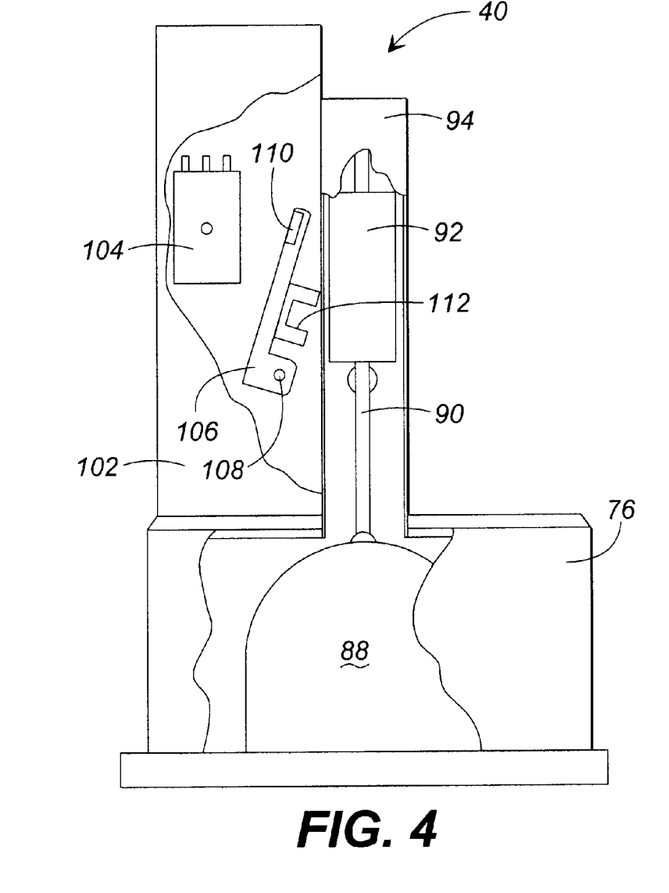
FIG. 4 is a partial side view of the carbonator tank of FIG. 2 with the pneumatic water level switch of FIG. 3 in cut-away view to depict the inactivated or full position of the pneumatic water level switch.

In the first embodiment, the water level within the tank 76 is monitored and controlled by a carbonator tank water level switch 40 that is mounted to the carbonator tank 16. FIGS. 3 and 4 illustrate the water level switch 40 and part of the carbonator tank in cut-away view. Preferably, the water level switch 40 comprises an outer housing 102 that is adapted to abut the hollow cylinder 94 of the carbonator tank 16. Located within the housing 102 is a pneumatic three-way magnetic proximity switch 104 and a lever arm 106. While the proximity switch 104 is fixed in position within the housing, the lever arm 106 is free to rotate about a pin 108 such that the lever arm is pivotally mounted within the water level switch 40. Mounted to the lever arm 106 are first and second magnets 110 and 112. The first magnet 110 is mounted to the arm 106 at a position in which it is adjacent the proximity switch 104 when the lever arm is oriented vertically as shown in FIG. 3.

Being attracted to the proximity switch 104, the first magnet 110 maintains the lever arm 106 in the vertical orientation when the tank 76 is not full. When the lever arm 106 is in this vertical orientation, positive contact is made with the proximity switch 104, thereby activating the switch and causing it to send a pneumatic pressure signal to the water valve 64 to remain open so that the tank 76 can be filled. As the water level rises within the tank 76, however, the magnetic member 92 within the hollow tube 94 rises, and eventually reaches a position at which it is adjacent the second magnet 112 mounted on the lever arm 106. Since the magnetic member 92 is constructed of a magnetic metal, such as magnetic stainless steel, the second magnet 112 of the lever arm 106 is attracted to the member. In that the attractive forces between the second magnet 112 and the magnetic member 92 are greater than those between the first magnet 110 and the proximity switch, the lever arm 106 pivots toward the magnetic member as depicted in FIG. 4. Due to this pivoting, contact between the first magnet 110 and the proximity switch 104 is terminated, thereby deactivating the proximity switch. Being deactivated, the proximity switch 104 then shuts off the supply of pressurized $CO_2$ gas to the water valve 64, causing the normally closed valve to cut-off the flow of water to the carbonator tank 16.

In operation, the first embodiment 10 of the beverage dispensing system can be used to dispense carbonated and noncarbonated mixed beverages, as well as any carbonated and noncarbonated unmixed beverages, in liquid form. To use the system, the water tank 52 is filled with water via the water tank refill check valve 62 and water chamber line 60. Once the water tank 52 has been filled to an appropriate level, the three-way vent valve 59 is manually switched to the gas open position such that the lower chamber 58 of the tank and the high pressure gas supply line 50 are in open fluid communication with one another.

To initiate the carbonization process, the operator opens the shut-off valve 22 of the gas storage tank 20 so that high pressure $CO_2$ gas flows to the three gas pressure regulators 26, 28, and 30. After passing through the first pressure regulator 26, $CO_2$ gas flows into the carbonator tank 16, raising the pressure within the tank to approximately 90 psi to 110 psi. At approximately the same time, the high pressure $CO_2$ gas also flows through the second and third pressure regulators 28 and 30. After exiting the second pressure regulator 28, the gas is supplied to both to the pneumatic three-way magnetic proximity switch 104 of the water level switch 40 and to the concentrated syrup container 44. The gas supplied to the proximity switch 104 is used, as needed, to send pneumatic pressure signals to the water valve 64. After passing through the third pressure regulator 30, the high pressure gas passes through the high pressure gas supply line 50, through the three-way vent valve 59, and into the lower chamber 58 of the water tank 52 to fill and pressurize the lower chamber.

As the $CO_2$ gas flows into the lower chamber 58, the water contained in the upper chamber 56 is forced out of the tank 52 and flows through the water chamber line 60 to travel to both the carbonator tank water valve 64 and the water pressure regulator 72. The water that passes through the water pressure regulator is piped into and through the flat water supply line 74 to be cooled by the cold plate 48 and, if desired, dispensed through the beverage dispenser valve 18.

Assuming the carbonator tank 16 to initially not contain water, the float member 88 contained therein is positioned near the bottom of the tank 76 and the water tank level switch 40 is in the activated position shown in FIG. 3. When the water tank level switch 40 is in this activated position, pneumatic pressure is provided to the water valve 64, keeping it in the open position so that water can flow into the carbonator tank 16. As the water continues to flow from the water tank 52 and fills all lines connected thereto, the pressure of the water begins to rise sharply. Eventually, the pressure of the water in the upper chamber 56 and the lines in fluid communication therewith reach a pressure equal to that of the high pressure $CO_2$ gas contained in the lower chamber 58. Accordingly, water enters the tank at high pressure, typically at approximately 175 psi to 225 psi.

Since the carbonator tank 16 is relatively small when compared to the $CO_2$ container 20 and water tank 52, it normally fills quickly. Therefore, carbonated water is available soon after the carbonization system is initiated. As such, the operator can use the beverage dispensing valve 18, commonly referred to as a "bar gun," to dispense either flat water supplied by the flat water supply line 74 or carbonated water supplied by the carbonated water supply line 82. Similarly, concentrated syrup, or other concentrated liquid, can be dispensed such that a mixed flat or carbonated drink can be post-mixed in a selected beverage container C.

Once the carbonator tank 16 is full, the water level switch 40 becomes oriented in the inactivated position (FIG. 4), thereby shutting-off the supply of gas to the water valve 64. Not having the pressure signal needed to remain open, the water valve 64 closes, cutting the supply of water to the carbonator tank 16. As the water level is again lowered, the water level switch is again activated, restarting the process described hereinafter. The system therefore cycles in response to the volume of water contained within the carbonator tank 16. Typically, the cycle will occur repeatedly until either the gas or water supplies are depleted. At this time, either or both may be refilled, and the system reinitiated.

Figure 5:
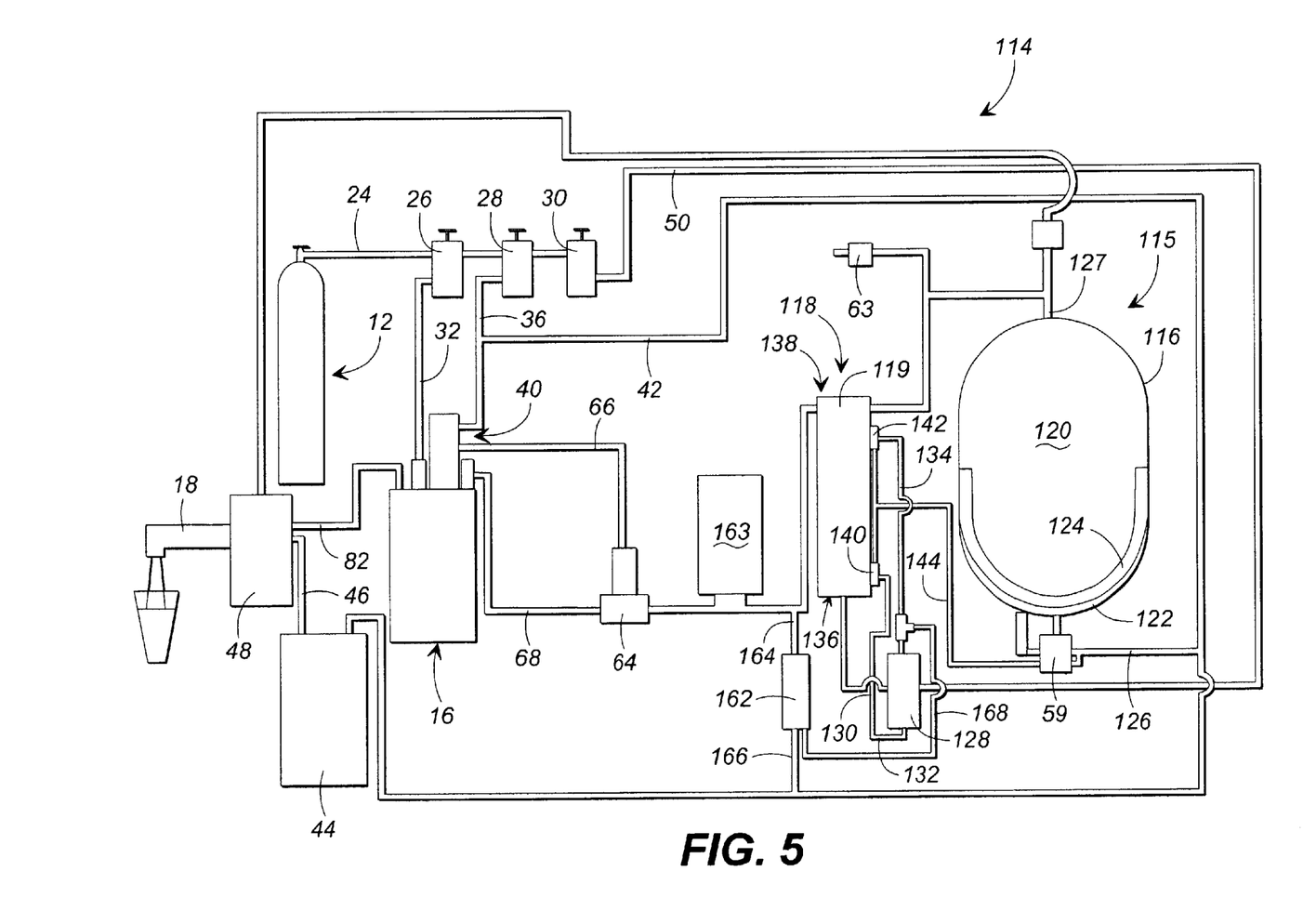
FIG. 5 is a schematic view of a second embodiment of a self-contained high pressure pneumatic beverage dispensing system.

FIG. 5 is a schematic view of a second embodiment 114 of a self-contained high pressure pneumatic beverage dispensing system. Since the second embodiment 114 is nearly identical in structure and function as that of the first except as to the water source and the pressure levels provided to the various components, the following discussion is focused on the water source 115 and the pressure levels associated therewith.

In this second embodiment 114, the high pressure water tank of the first embodiment is replaced with a low pressure water tank 116 and a high pressure water pump system 118 that includes a pneumatic water pump 119. The low pressure water tank 116 is similar in construction to the high pressure water tank and therefore has upper and lower chambers 120 and 122 separated by a pliable diaphragm 124. Due to the presence of the pneumatic water pump 119, the water within the water tank 116 need not be at high pressure. Accordingly, instead of being supplied with $CO_2$ gas at approximately 175 psi to 225 psi, the water tank is supplied with gas at pressures at approximately 25 psi to 60 psi. Therefore, the water tank 116 is supplied with gas from a low pressure gas supply line 126 that branches from the syrup container line 42 described in the discussion of the first embodiment 10. Since it will not be subjected to high pressure $CO_2$ gas, the low pressure water tank 116 can be constructed of a mild steel as opposed to a stainless steel which tends to be substantially more expensive. Similar to the water tank of the first embodiment, pressurized water can leave the upper chamber 120 of the tank 116 through a water chamber line 127. In one direction, the pressurized water supplied by the water tank 116 flows to the pneumatic water pump 119 to fill the pump with water. In a second direction, the water flows through flat water line to the cold plate 48.

In the second embodiment, the high pressure gas supply line 50 supplies gas at approximately 175 psi to 225 psi to a pneumatic water pump control valve 128. As shown in FIG. 5, in addition to the high pressure gas supply line 50, the control valve 128 is connected to a pump gas supply line 130, and first and second pneumatic signal lines 132 and 134. The pump gas supply line 130 connects in fluid communication to the pneumatic water pump 119 at its first end 136. The pneumatic signal lines 132 and 134 connect to first and second piston sensors 140 and 142 respectively. The first piston sensor 140 is mounted to the pump adjacent its first end 136 and the second piston sensor 142 is mounted to the pump adjacent its second end 138. Each of the piston sensors 140 and 142 is connected to a sensor gas supply line 144 which is in fluid communication with the low pressure gas supply line 126.

Figure 6:
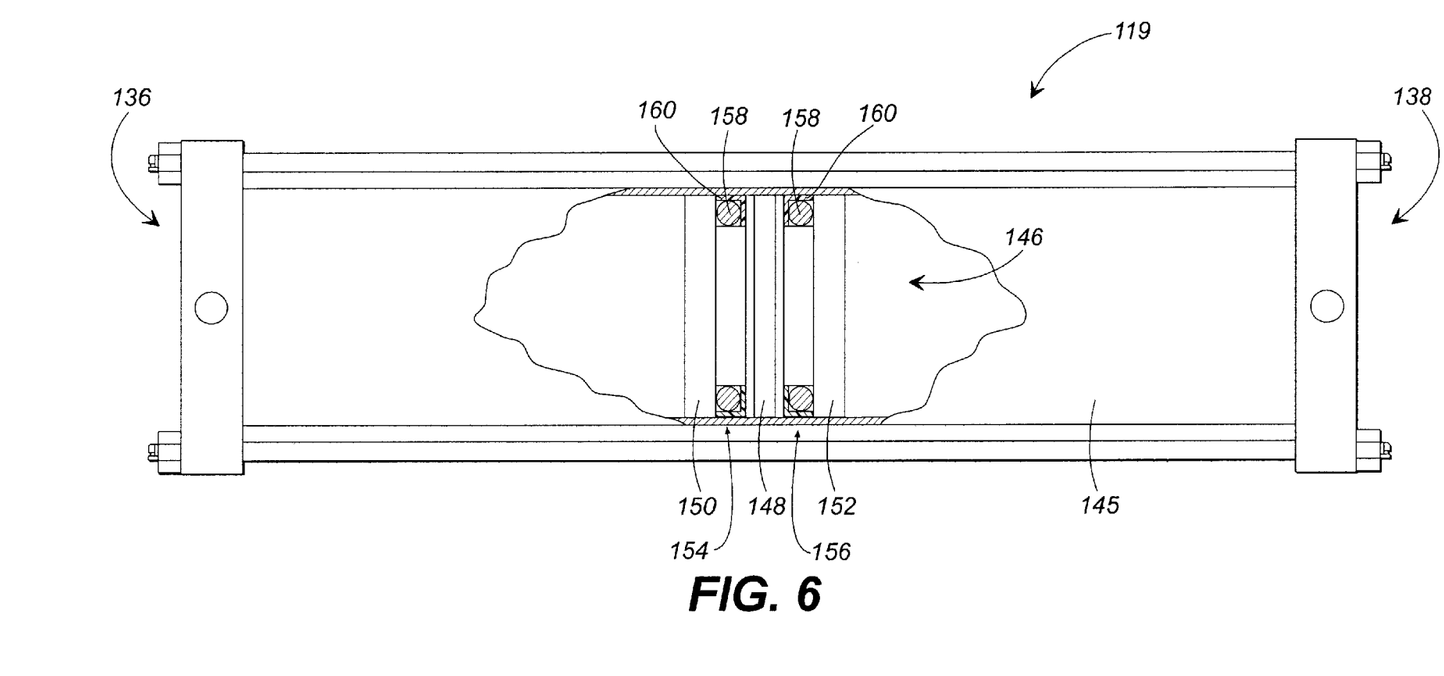
FIG. 6 is a partial cut-away view of the high pressure water pump used in the beverage dispensing system of FIG. 5 depicting the rodless piston contained within the cylindrical tube of the water pump.

As shown in FIG. 6, the pneumatic water pump 119 comprises a piston cylinder 145 and a rodless piston 146. The rodless piston comprises a central magnet 148 that is positioned intermediate two piston end walls 150 and 152. Located between the magnet 148 and each of the end walls 150 and 152 are seals 154 and 156. Typically, these seals comprise an inner resilient O-ring 158 and an outer lip seal 160. Configured in this manner, the seals 154 and 156 prevent fluids from passing between the piston 146 and the piston cylinder 145, but permit sliding of the piston along the cylinder.

In an initial filled state, with the piston 146 positioned adjacent the first end 136 of the pump 119, the first piston sensor 140 senses the proximity of the piston due to its magnetic attraction to the piston. When such a condition is sensed, the sensor 140 is activated and sends a pneumatic pressure signal to the control valve 128, causing the control valve to open. While the control valve 128 is in the open position, high pressure gas flows through the control valve, along the pump gas supply line 130, and into the gas side of the pump 119. The high pressure gas ejects the water contained in the water side of the pump 119, eventually pressurizing the water to approximately 175 psi to 225 psi.

From the pump 119, the pressurized water flows to the carbonator tank 16 in similar manner as in the first embodiment 10. When nearly all of the water is driven out of the pump 119 with the piston 146, the second piston sensor 142 activates in similar manner to the first piston sensor 140, and sends a pneumatic pressure signal to the control valve 128 that causes the valve to cut-off the supply of gas to the pump and vent the piston cylinder 145 so that the relatively low pressure water can again fill the pump. Once the pump 119 is completely filled, the first piston sensor 140 is again activated, and the system cycles again.

Although the system, as described herein, is believed to be complete and effective, the system can further include a pump reset switch 162 and/or an accumulator tank 163. As shown in FIG. 5, the reset switch 162 receives high pressure water from the pump through water supply line 164. The reset switch 162 also receives low pressure $CO_2$ gas from the syrup supply line 42 through gas supply line 166. Linking the reset switch 162 and the pump control valve 128 is a pneumatic signal line 168 which connects to the second signal line 134. So described, the pump reset switch 162 ensures that there is an adequate amount of carbonated water to meet the demand. For instance, if the piston 146 is positioned at some intermediate point along the length of its stroke and the carbonator tank 16 is filled, switching the water valve 64 off, equilibrium can be achieved, dropping the pressure of the water, therefore indicating that the water pump 119 is not full. Upon sensing this water pressure drop, the reset switch 162 sends a pneumatic pressure signal to the control valve 128, causing the valve to close and vent the gas pressure in the pump 119 so that the pump can be refilled and a full piston stroke then executed.

Another optional component that ensures adequate supply of high pressure water is the accumulator tank 163. The accumulator tank 163 contains an internal diaphragm (not shown) which separates the lower chamber of the tank from the upper chamber of the tank. In the upper chamber is a volume of nitrogen gas. In operation, the lower chamber fills with high pressure water supplied by the pump 119. As the accumulator tank 163 is filled, the nitrogen gas contained in the upper chamber is compressed. In this compressed state, the gas can force the water out of the accumulator tank 163 during situations in which carbonated water demand is high and the pump 119 is in the refill portion of its cycle.

Figures 7, 8:
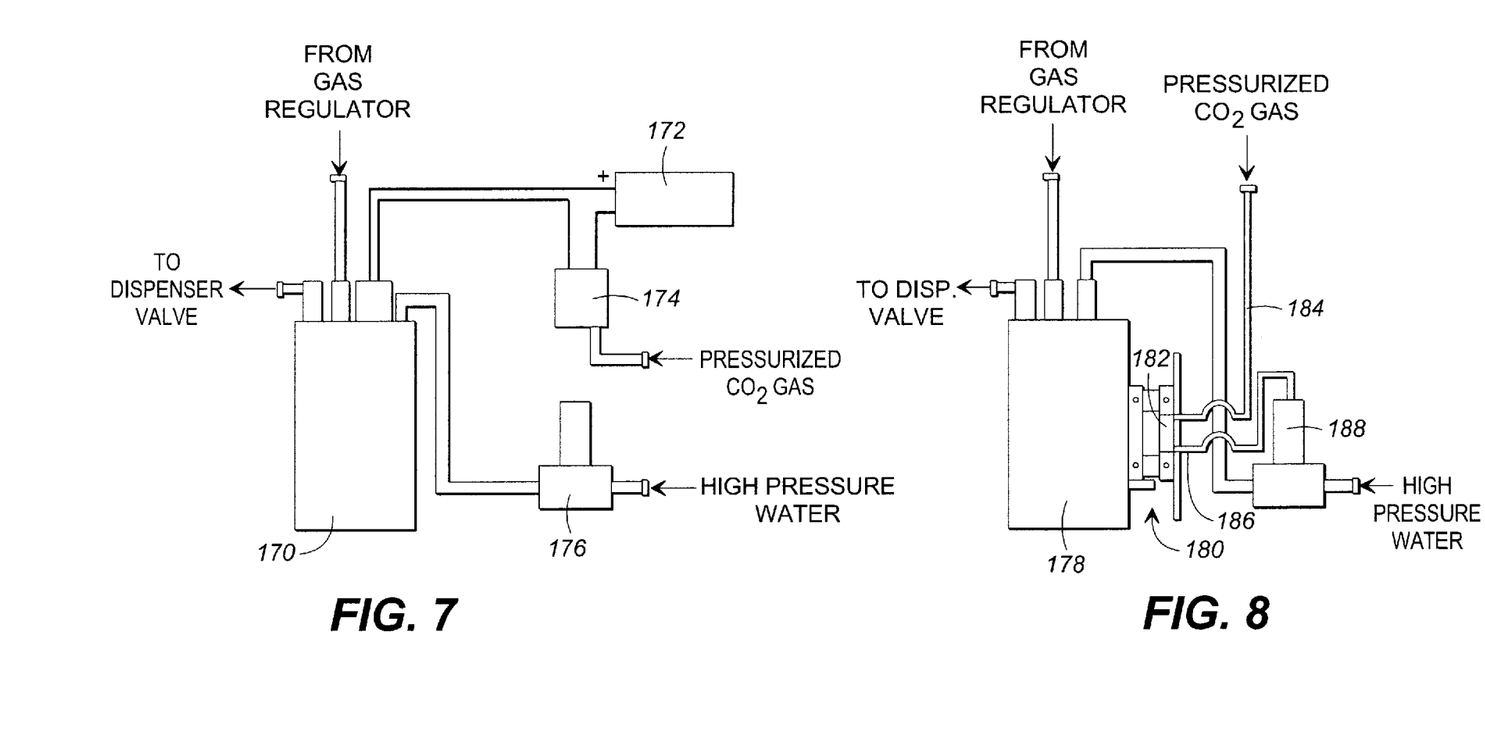
FIG. 7 is a schematic view of an alternative carbonator tank and filling system.
FIG. 8 is schematic view of another alternative carbonator tank and filling system.

FIG. 7 illustrates an alternative carbonator tank and filling system for use in either of the aforementioned embodiments. The system comprises a conventional electrically sensed, high pressure carbonator tank 170 and an electric power source 172. Considered suitable for this application is any of the electrically sensed carbonator tanks produced by McCann. To ensure portability, the power source 172 typically comprises a battery. Electrically connected to the carbonator sensor (not shown) are both the power source 172 and a low voltage pneumatic interface valve 174. The interface valve 174 is in fluid communication with both a source of pressurized $CO_2$ gas and a pneumatic water valve 176.

When the electric sensors within the carbonator tank 170 detect that the carbonator tank is not full, the sensors electrically signal the interface valve 174. The signal received by the interface valve 174, causes it to open and send a pneumatic pressure signal to the pneumatic water valve to cause it to open so that the carbonator tank can be refilled in the manner discussed hereinabove.

FIG. 8 illustrates a further alternative carbonator tank and filling system for use with the present beverage disposing system which comprises a conventional high pressure carbonator tank 178. The carbonator tank 178 is mounted to a vertical surface with a spring loaded carbonator mounting bracket 180. Coupled to this mounting bracket is a pneumatic three-way valve 182 that is in fluid communication with a high pressure $CO_2$ gas supply line 184 and a pneumatic signal line 186 which is in turn connected to a pneumatic water valve 188.

When the tank 178 is empty, it is supported by the carbonator mounting bracket 180 in an upright orientation. While the tank 178 is positioned in this upright orientation, the pneumatic three-way valve 182 is open, thereby sending a pneumatic pressure signal to the water valve to remain open. Once the tank 178 is nearly full, however, its weight overcomes the force of the spring within the bracket, causing the tank to tilt. This tilting action closes the three-way valve, which in turn closes the water valve 188 and shuts-off the supply of pressurized water to the carbonator tank 178.

While preferred embodiments of the invention have been disclosed in detail in the foregoing description and drawings, it will be understood by those skilled in the art that variations and modifications thereof can be made without departing from the spirit and scope of the invention as set forth in the claims and such variations and modifications are intended to be part of this disclosure. For instance, although the second embodiment of the invention is described as comprising a separate water tank and water pump, it will be understood by persons having ordinary skill in the art that these two components could essentially be combined into a single component such as a high volume, high pressure water pump. In such an arrangement, the pump would function similarly as the pump described in the second embodiment, however, would only complete one stroke instead of cycling between dispensing and refilling strokes. Because of this fact, the pump control valve, piston sensors, and associated pipelines would be unnecessary in such an embodiment.

What is claimed is:

1. A water pressurization and supply system, comprising:
   a water pump having a piston cylinder having first and second ends and including a gas inlet in fluid communication with a first side of said cylinder and a water inlet and water outlet in fluid communication with a second side of said cylinder, said water pump further having a piston that is disposed within said piston cylinder between said first and second ends, wherein said water pump is adapted to be filled with high pressure gas on said first side of said cylinder through said gas inlet and further is adapted to be filled with water on said second side of said cylinder through said water inlet; and
   a water pump control system that comprises a first piston sensor positioned adjacent said first end of said piston cylinder, a second piston sensor positioned adjacent said second end of said piston cylinder, and a water pump control valve operably connected to said first and second piston sensors and in fluid communication with said gas inlet of said piston cylinder, wherein said first piston sensor sends a signal to said control valve when proximity of said piston is sensed to cause said control valve to open to permit high pressure gas to enter said first side of said piston cylinder/and pressurize the water contained in said second side of said piston cylinder and said second piston sensor sends a signal to said control valve when proximity of said piston is sensed to cause said control valve to close and vent gas contained in said first side of said piston cylinder, thereby permitting said second side of said piston cylinder to be refilled with water.

2. The system of claim 1, wherein said water pump control valve includes a vent through which gas contained within said first side of said piston cylinder can be vented to the atmosphere.

3. The system of claim 1, wherein said piston is a rodless piston.

4. The system of claim 1, wherein said piston includes magnetized material and wherein said first and second piston sensors are magnetically actuatable.

5. The system of claim 1, wherein said first and second piston sensors are mounted to said piston cylinder adjacent said first and second ends of said piston cylinder, respectively.

6. The system of claim 1, wherein said gas inlet is positioned adjacent said first end of said piston cylinder and said water inlet and said water outlet are positioned adjacent said second end of said piston cylinder.

7. The system of claim 1, wherein said water pump control valve is pneumatically actuated and in fluid communication with said first and second piston sensors which send pneumatic signals to said water pump control valve to respectively pressurize and depressurize said water pump.

8. The system of claim 1, wherein said water pump control system further comprises a water pump reset system including a switch in communication with said water outlet and said water pump control valve, wherein when said switch senses low water pressure exiting said water pump, said switch sends a signal to said water pump control valve to cause said piston to return to said first end of said piston cylinder to permit water to fill said second side of said piston cylinder.

9. The system of claim 8, wherein said switch is a pneumatic pressure switch and said water pump control valve is pneumatically actuated, said pneumatic pressure switch being capable of sending a pneumatic pressure signal to said water pump control valve.

10. A water pump suitable for use in a self-contained beverage dispensing system, said water pump comprising:
 a piston cylinder having first and second ends and first and second sides, said first side of said cylinder being adapted to be filled with high pressure gas and said second side of said cylinder being adapted to be filled with water;
 a piston disposed within said piston cylinder between said first and second ends of said cylinder and dividing said piston cylinder into said first and second sides;
 a gas inlet in fluid communication with said first side of said piston cylinder and adapted to fill said first side of said piston cylinder with high pressure gas;
 a water inlet in fluid communication with said second side of said piston cylinder and adapted to transport water into said second side of said piston cylinder;
 a water outlet in fluid communication with said second side of said piston cylinder and adapted to transport water away from said second side of said piston cylinder;
 wherein water contained in said second side of said piston cylinder can be pressurized by said piston under the pressure of the high pressure gas in said first side of said piston cylinder such that pressurized water can flow through said water outlet under the influence of said piston.

11. The pump of claim 10, wherein said piston is a rodless piston.

12. The pump of claim 10, wherein said first and second piston sensors are mounted to said piston cylinder adjacent said first and second ends of said piston cylinder, respectively.

13. The pump of claim 10, wherein said gas inlet is positioned adjacent said first end of said piston cylinder and said water inlet and said water outlet are positioned adjacent said second end of said piston cylinder.

14. The pump of claim 10, further including first and second piston sensors that are used to sense the position of said piston.

15. The pump of claim 14, wherein said piston includes magnetized material and wherein said first and second piston sensors are magnetically actuatable.

16. A method for cyclically pressurizing and supplying water, comprising:
 supplying gas to a first side of a water pump;
 supplying water to a second side of the water pump;
 increasing the pressure of the gas in the first side of the water pump such that the first side of the water pump exerts pressure on the second side of the water pump to pressurize the water therein;
 transporting the pressurized water from the second side of the water pump until a near empty state is achieved in which nearly all of the water has been removed from the second side of the water pump; and
 sensing the near empty state of the second side of the water pump and sending a pneumatic signal to a control element to cause gas to vent from the first side of the water pump such that the second side of the water pump can be refilled with water.

17. The method of claim 16, further comprising the step of sensing when nearly all of the water has been removed from the second side of the water pump.

18. The method of claim 16, further comprising the step of sensing when the second side of the water pump is substantially filled with water.

19. A beverage dispensing system, comprising:
 a water pressurization and supply system, including:
  a water pump having a piston cylinder having first and second ends and including a gas inlet in fluid communication with a first side of said cylinder and a water inlet and water outlet in fluid communication with a second side of said cylinder, said water pump further having a piston that is disposed within said piston cylinder between said first and second ends, wherein said water pump is adapted to be filled with high pressure gas on said first side of said cylinder through said gas inlet and further is adapted to be filled with water on said second side of said cylinder through said water inlet; and
  a water pump control system that comprises a first piston sensor positioned adjacent said first end of said piston cylinder, a second piston sensor positioned adjacent said second end of said piston cylinder, and a water pump control valve operably connected to said first and second piston sensors and in fluid communication with said gas inlet of said piston cylinder, wherein said first piston sensor sends a signal to said control valve when proximity of said piston is sensed to cause said control valve to open to permit high pressure gas to enter said first side of said piston cylinder and pressurize the water contained in said second side of said piston cylinder and said second piston sensor sends a signal to said control valve when proximity of said piston is sensed to cause said control valve to close and vent gas contained in said first side of said piston cylinder, thereby permitting said second side of said piston cylinder to be refilled with water.

20. The beverage dispensing system of claim 19, wherein said water pump control valve includes a vent through which gas contained within said first side of said piston cylinder can be vented to the atmosphere.

21. The beverage dispensing system of claim 19, wherein said piston is a rodless piston.

22. The beverage dispensing system of claim 19, wherein said piston includes magnetized material and wherein said first and second piston sensors are magnetically actuatable.

23. The beverage dispensing system of claim 19, wherein said first and second piston sensors are mounted to said piston cylinder adjacent said first and second ends of said piston cylinder, respectively.

24. The beverage dispensing system of claim 19, wherein said gas inlet is positioned adjacent said first end of said piston cylinder and said water inlet and said water outlet are positioned adjacent said second end of said piston cylinder.

25. The beverage dispensing system of claim 19, wherein said water pump control valve is pneumatically actuated and in fluid communication with said first and second piston sensors which send pneumatic signals to said water pump control valve to respectively pressurize and depressurize said water pump.

26. The beverage dispensing system of claim 19, wherein said water pump control system further comprises a water pump reset system including a switch in communication with said water outlet and said water pump control valve, wherein when said switch senses low water pressure exiting said water pump, said switch sends a signal to said water pump control valve to cause said piston to return to said first end of said piston cylinder to permit water to fill said second side of said piston cylinder.

27. The beverage dispensing system of claim 26, wherein said switch is a pneumatic pressure switch and said water pump control valve is pneumatically actuated, said pneumatic pressure switch being capable of sending a pneumatic pressure signal to said water pump control valve.

28. A water pump suitable for use in a self-contained beverage dispensing system, said water pump comprising:
   a piston cylinder having first and second ends and first and second sides, said first side of said cylinder being adapted to be filled with high pressure gas and said second side of said cylinder being adapted to be filled with water;
   a piston disposed within said piston cylinder between said first and second ends of said cylinder and dividing said piston cylinder into said first and second sides;
   a gas port in fluid communication with said first side of said piston cylinder;
   a water port in fluid communication with said second side of said piston cylinder; and
   a sensing system that is adapted to send pneumatic signals in response to sensed piston positions to a control element, the signals instructing the control element to either pressurize or refill said second side of said piston cylinder.

29. The pump of claim 28, wherein said piston is a rodless piston.

30. The pump of claim 28, wherein said sensing system includes first and second piston sensors positioned adjacent said first and second ends of said piston cylinder.

31. The pump of claim 30, wherein said piston comprises magnetic material and said piston sensors are magnetically actuatable.

32. The pump of claim 28, wherein said gas port is positioned adjacent said first end of said piston cylinder and said water port is positioned adjacent said second end of said piston cylinder.

33. A method for providing pressurized water in a beverage dispensing system with a pneumatic water pump, comprising:
   supplying water to a water side of the water pump;
   supplying gas to a gas side of the water pump to pressurize the water in the water side of the pump; and
   expelling pressurized water from the water side of the pump as required from the dispensing system until a near empty condition is achieved; and
   sensing the near empty condition of the water side of the pump and sending a pneumatic signal to a control element to instruct the control element to refill the water side of the pump with water.

34. The method of claim 33, wherein the step of sensing the near empty condition of the water side of the pump is accomplished with a sensing system that includes a piston sensor that is adapted to sense proximity of a piston disposed within the pump.

35. The method of claim 34, wherein the step of sensing the near empty condition of the water side of the pump is accomplished with a sensing system that includes first and second piston sensors that are adapted to sense proximity of a piston disposed within the pump, the first piston sensor being positioned adjacent at an end of the gas side of the pump and the second piston sensor being positioned adjacent an end of the water side of the pump.

36. The method of claim 34, wherein the first piston sensor is used to signal the control element to deliver gas to the gas side of the pump to expel water from the water side of the pump and the second piston sensor is used to signal the control element to vent the gas side of the pump to permit water to refill the water side of the pump.

* * * * *